July 27, 1965  A. J. ZANNI  3,196,749
GUIDE ROLLER BRAKE FOR ROUTER
Filed Jan. 23, 1964
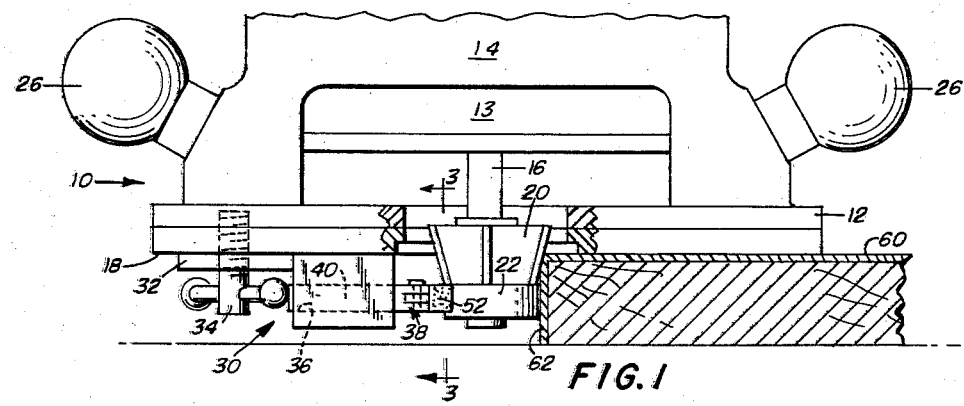
FIG. 1
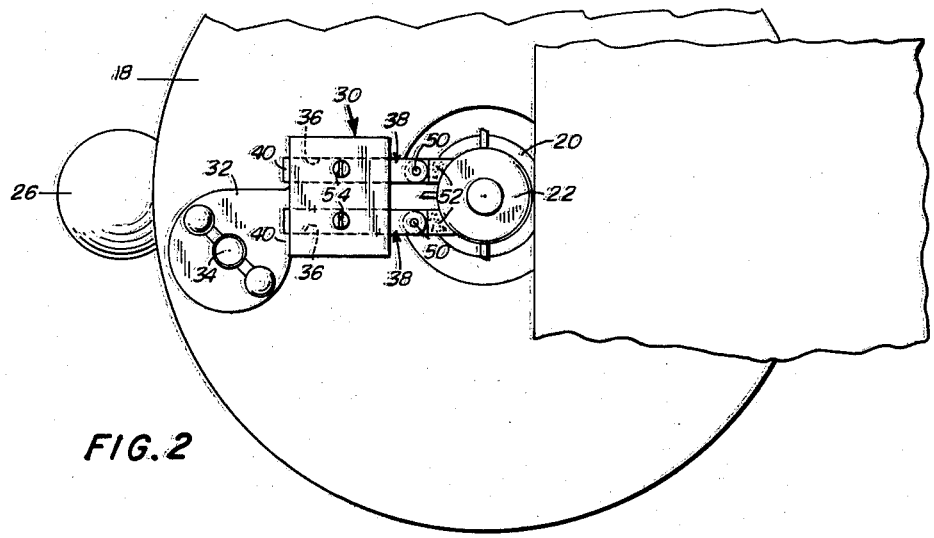
FIG. 2
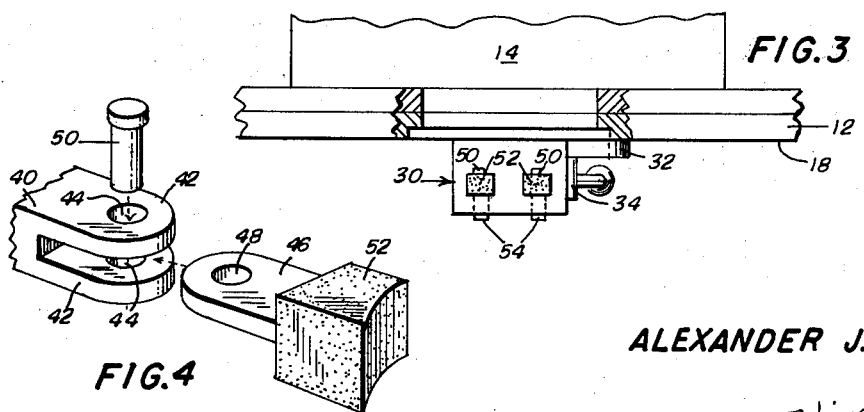
FIG. 3
FIG. 4
INVENTOR
ALEXANDER J. ZANNI
BY Bowyer & Witherspoon
ATTORNEY

United States Patent Office 3,196,749
Patented July 27, 1965

3,196,749
GUIDE ROLLER BRAKE FOR ROUTER
Alexander J. Zanni, Binghamton, N.Y., assignor to American Machine & Research Corporation, Johnson City, N.Y., a corporation of New York
Filed Jan. 23, 1964, Ser. No. 339,629
4 Claims. (Cl. 90—12)

This invention relates to an attachment for use on a router and more particularly to a device secured to a router to prevent rotation of a guide roller mounted on the rotating shaft provided for the cutter.

The type of router for which the device of this invention is particularly adapted is one comprising an annular base on which is mounted an electric motor having its shaft vertically disposed so that the lower free end will be positioned centrally in and below the hole in the base. The cutter is mounted on the lower end of the motor shaft and directly beneath the cutter there is provided a guide roller suitably secured to the motor shaft so that it may rotate independently of the rotation of the motor shaft. The guide roller brake of this invention is mounted on the router base in such a manner that it may engage the guide roller provided on the lower extremity of the motor shaft and prevent same from rotating with the shaft and cutter carried thereon. In many instances, the bearings or other means used to mount the guide roller on the motor shaft become gummy or otherwise clogged up and prevent the guide roller from rotating independently of the motor shaft. When such a condition occurs the guide roller will rotate in the same manner as the cutter and thereby mar the finish of the surface on which it bears. This is very undesirable and it is with this in mind that the guide roller brake of this invention has been devised.

In the manufacturing of furniture, cabinets and the like, surfaced with high pressure laminates, it is customary to assemble the laminates on the surfaces to be covered with a slight overhang which is trimmed off to provide a very smooth and even edge. This trimming operation is most easily accomplished with a portable router of the type described above. The cutter which projects below the router base cuts away the excess laminate to provide the finished edge. Obviously the cutter must be accurately guided to produce a true and attractive edge finish. It is for this purpose that the guide roller is provided on the lower end of the motor shaft.

With the above in mind, it is an object of this invention to provide a router having a guide roller mounted for independent rotation on the shaft which carries the router cutter with guide roller braking means for controlling rotation of the guide roller.

It is another object to provide a guide roller brake assembly comprising a brake base member secured to the base of the router and a brake shoe means adjustably carried by said brake base member adapted to engage the guide roller.

It is a still further object to provide a guide roller brake assembly which includes a pair of pivotally mounted brake shoes adapted to engage the guide roller.

The above and other objects and advantages will become more apparent when taken in conjunction with the following detailed description and drawing showing, by way of example, a preferred embodiment of this invention, and wherein:

FIG. 1 is an elevational view, partly in section, showing the router and the guide roller brake assembly mounted thereon as they would be employed in chamfering or trimming an edge portion of a laminated surface;

FIG. 2 is a bottom view of the subject matter shown in FIG. 1;

FIG. 3 is a partly sectional view taken along line 3—3 of FIG. 1; and

FIG. 4 is a perspective view of one of the pivotally mounted brake shoes.

As best illustrated in FIGS. 1, 2, and 3, the guide roller brake of the invention is used with a more or less conventional router 10 comprising an annular base 12 with an electric motor 13 mounted in a housing 14 in turn secured to the base. The electric motor 14 is so positioned that its shaft 16 is positioned centrally within the hole in the base 12 and extends downwardly below the lower face 18 of the base 12. A cutter 20 is secured to the lower end portion of the shaft 16 and a guide roller 22 is mounted on shaft 16 directly beneath the cutter 20. The guide roller 22 is so mounted that it will rotate freely and independently of the shaft 16. Obviously this may be accomplished in many ways, such as ball bearing combinations or otherwise, and, since this feature forms no part of the invention, it has not been illustrated. The router 10 has a pair of handles 26 by which the unit may be manipulated.

The guide roller brake 30 comprises a base member 32 secured to the lower face 18 of the router base 12 by means of threaded member 34. The base member 32 has a pair of parallel longitudinally extending openings 36—36 which slidably carry brake shoe holder assemblies 38—38. Each brake shoe holder assembly 38 comprises a rectangular bar 40 having a bifurcated end portion forming a pair of spaced parallel lugs 42—42 as best illustrated in FIG. 4. Aligned holes 44—44 are formed in these lugs. A brake shoe plate 46 having a hole 48 adjacent one end is placed between the lugs 42—42 with its hole 48 in alignment with holes 44—44 in the lugs. A pin 50 is used to pivotally secure the brake shoe plate 46 to the brake shoe bar 40. A brake shoe 52 is secured to the outward free end of brake shoe plate 46. This brake shoe may be made from any of the conventional brake shoe materials and, in addition, the use of plastic may be advantageous in certain instances. The brake shoe assemblies 38 are retained in position by means of set screws 54 appropriately mounted in the base member 32.

It is believed that, with the foregoing description, the operation of the brake of this invention is apparent; however, a brief explanation will be given.

As illustrated in FIG. 1, the router 10 is placed down on the laminated surface 60 in such a manner that the guide roller 22 will bear against the vertical laminated surface 62. With the router in this position, the cutter 20 will engage the end portion of the laminated surface 60 and chamfer or bevel it slightly. In order to prevent rotation of guide roller 22, the brake shoe assemblies 38 are extended in the direction of the guide roller 22 so that the shoes 52 will firmly engage same, whereupon the set screws 54 are tightened, thereby retaining the brake shoe assemblies in engaged braking position. The amount or degree of braking force necessary depends to a large extent on whether or not the guide roller mounting means is left clean. For example, if the glue and material cuttings find their way into the guide roller mounting, then naturally the guide roller will tend to rotate with the shaft 16 and thus require braking of the braking device.

It is to be understood that the above description of the invention is, by way of example, one illustration of this invention, and the only limitations placed thereupon are those found in the following claims.

I claim:
1. In combination with a router having an annular base, an electric motor mounted on said base with its motor shaft vertically disposed so that its lower end portion will be positioned centrally and below the hole in the base, a cutter mounted on the shaft, and a guide roller mounted on the shaft below the cutter for rotation independently of the shaft, and a guide roller brake assembly mounted on the router base, said brake assembly comprising a pair of brake shoe assemblies adjustably mounted on the router base and adapted to engage the guide roller.

2. In combination with a router having an annular base, an eletric motor mounted on said base with its motor shaft vertically disposed so that its lower end portion will be positioned centrally and below the hole in the base, a cutter mounted on the shaft, and a guide roller mounted on the shaft below the cutter for rotation independently of the shaft, and a guide roller brake assembly mounted on the router base, said brake assembly comprising a base member adjustably mounted on the router base, and a pair of brake shoe assemblies adjustably mounted on the base member and being adapted to engage the guide roller.

3. The invention as described in claim 2 and wherein each brake shoe assembly includes a pivotally mounted brake shoe adapted to engage the guide roller.

4. In combination with a router having an annular base, an electric motor mounted on said base with its motor shaft vertically disposed so that its lower end portion will be positioned centrally and below the hole in the base, a cutter mounted on the shaft, and a guide roller mounted on the shaft below the cutter for rotation independently of the shaft, and a guide roller brake assembly mounted on the router base, said brake assembly comprising a base member, screw means for securing the base member to the lower face of the router base, said base member having two parallel longitudinally extending rectangular openings therein, a pair of brake shoe holder assemblies slidably carried in said openings, means for securing the brake shoe holder assemblies in said base member, each brake shoe holder assembly comprising a rectangular bar having a bifurcated end portion forming a pair of spaced parallel lugs, said parallel lugs having aligned holes extending therethrough, a brake shoe plate having a hole through one end portion, said brake shoe plate being positioned between the lugs so that its hole will align with those in the lugs, a pin in the aligned holes for pivotally mounting the brake shoe plate, and a brake shoe mounted on the free end of each brake shoe plate, said brake shoes being adapted to engage the guide roller to prevent rotation thereof.

No reference cited.

WILLIAM W. DYER, JR., *Primary Examiner.*